United States Patent
Chen et al.

(10) Patent No.: US 7,499,627 B2
(45) Date of Patent: Mar. 3, 2009

(54) METHOD AND APPARATUS FOR RECORDING AND REPRODUCING INFORMATION

(75) Inventors: Ching-Hai Chen, Taipei (TW); Ching-Ho Huang, Taipei (TW)

(73) Assignee: Lite-On It Corporation, Taipei (TW)

( * ) Notice: Subject to any disclaimer, the term of this patent is extended or adjusted under 35 U.S.C. 154(b) by 728 days.

(21) Appl. No.: 11/116,247

(22) Filed: Apr. 28, 2005

(65) Prior Publication Data

US 2005/0244136 A1 Nov. 3, 2005

(30) Foreign Application Priority Data

May 3, 2004 (TW) .............................. 93112443 A

(51) Int. Cl.
*H04N 7/00* (2006.01)
*H04N 5/91* (2006.01)

(52) U.S. Cl. .......................................... 386/68; 386/46

(58) Field of Classification Search ................... 386/52, 386/105, 106, 109, 125, 124, 68, 69, 46
See application file for complete search history.

(56) References Cited

U.S. PATENT DOCUMENTS 5,134,499 A * 7/1992 Sata et al. .................... 386/109
5,377,051 A * 12/1994 Lane et al. .................... 386/81

* cited by examiner

*Primary Examiner*—Robert Chevalier
(74) *Attorney, Agent, or Firm*—Bacon & Thomas, PLLC

(57) ABSTRACT

An apparatus for recording and reproducing information includes a playing section and a recording section. The playing section has a play speed control unit for determining a play speed, and an image play unit for playing an image according to the play speed. The recording section has a query unit for outputting a query signal to the play speed control unit in order to acquire the play speed, and an image record unit for recording the image by proceeding to a record action according to the play speed. The method and apparatus for recording and reproducing information can efficiently increase record speed and short record time.

10 Claims, 1 Drawing Sheet

METHOD AND APPARATUS FOR RECORDING AND REPRODUCING INFORMATION

This application claims the benefit of Taiwan application Serial No. 93112443, filed May 3, 2004, the subject of which is incorporated herein by reference.

BACKGROUND OF THE INVENTION

1. Field of the Invention

The invention relates in general to a method and apparatus for recording and reproducing information, and more particularly to a method and apparatus for recording and reproducing information capable of shortening record time.

2. Description of the Related Art

In recent years, systems for playing back the contents of optical discs that record video data (moving pictures), audio data, and the like have been developed. Optical disks, such as CD-ROM, CD-R, CD-RW, DVD+RW, DVD-RW, and the like are capable of storing lots of information therein, which allows users to store and carry the recording contents easily, thereby the optical disks are popularly applied to business, multimedia, entertainment and people's daily life.

For an apparatus for recording and reproducing information (Such an apparatus for recording and reproducing information is called a record and play apparatus, hereafter) being electrically connected with televisions, it may use VHS tapes, compact discs (CDs) or digital versatile discs (DVDs) as information storing material. The record and play apparatus can not only record a TV program in real time when the program is shown on TV, but also translate data in VHS into a CD or DVD.

However, the record and play apparatus can record with 1× speed during playing image. Although the play speed of the record and play apparatus reaches 2×, 8×, 16×, 32×, 52×, even higher, the record speed of the apparatus is still limited to 1× during playing image. As a result, it will waste lots of time on recording if the information data is a big amount, especially during translation data in VHS into a CD or DVD.

SUMMARY OF THE INVENTION

It is therefore an object of the invention to provide a method and apparatus for recording and reproducing information (Such an apparatus or a method for recording and reproducing information is called a record and play apparatus or a record and play method, hereafter). The record and play apparatus of the present invention can efficiently increase record speed and short record time.

The invention achieves the above-identified object by providing a record and play apparatus includes a playing section and a recording section. The playing section has a play speed control unit for determining a play speed, and an image play unit for playing an image according to the play speed. The recording section has a query unit for outputting a query signal to the play speed control unit in order to acquire the play speed, and an image record unit for recording the image by proceeding to a record action according to the play speed.

Also, the invention achieves the above-identified object by providing a record and play method includes steps of: (a).determining a play speed; (b).playing an image according to the play speed; (c).outputting a query signal in order to acquire the play speed; and (d).recording the image by proceeding to a record action according to the play speed.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
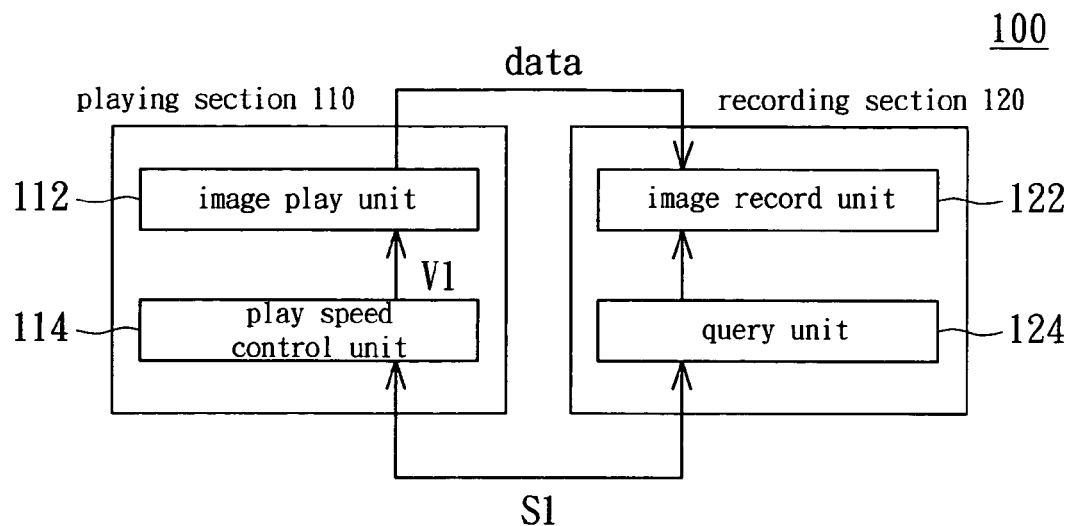
FIG. 1 is a sketch view of a record and play apparatus according to the preferred embodiment of the invention.

Referring to FIG. 1, which is a sketch view of a record and play apparatus according to the preferred embodiment of the invention. In FIG. 1, a record and play apparatus 100 includes a playing section 110 and a recording section 120. The playing section 110 has a play speed control unit 114 for determining a play speed V1, and an image play unit 112 for playing an image according to the play speed V1. The recording section 120 has a query unit 124 for outputting a query signal S1 to the play speed control unit 114 in order to acquire the play speed V1, and an image record unit 122 for recording the image in real time, which means that the image record unit 122 records the image by proceeding to a record action according to the play speed.

The play speed V1 can be chosen by users as 1×, 2×, 4× or other else. When users would like accelerate the speed of recording or copying, higher speed can be chosen such as 2× or 4× by the following procedure. Firstly, the query unit 124 outputs a query signal S1 to the play speed control unit 114 and the play speed V1 may acquire a higher speed, such as 2× or 4×. Then, the image record unit 122 can record the image according to the higher play speed, so that the limitation of conventional record and play method with single speed is resolved.

Figure 2:
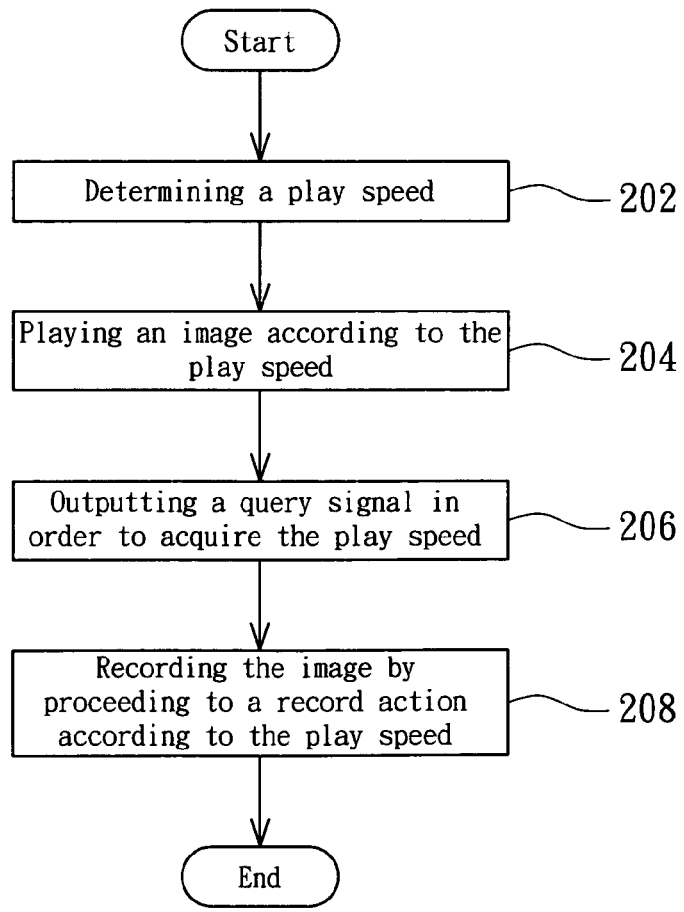
FIG. 2 is a flow chart showing a record and play method according to the preferred embodiment of the invention.

Referring both to FIG. 1 and FIG. 2, FIG. 2 is a flow chart showing a record and play method according to the preferred embodiment of the invention. The record and play method on the record and play apparatus 100 includes the steps as follow. At first, in step 202, a play speed V1 is determined by the play speed control unit 114 of the playing section 110.

Next, in step 204, an image is played according to the play speed V1. That is to say, the image play unit 112 of the playing section 110 plays the image according to the play speed V1 which is determined by the play speed control unit 114. Then, in step 206, a query signal is outputted in order to acquire the play speed. That is to say, a query signal S1 is outputted to the play speed control unit 114 by the query unit 124 in order to acquire the play speed V1 of the image play unit 112. Finally, in step 208, the image is recorded by proceeding to a record action according to the play speed. That is to say, after the query unit 124 receives the play speed V1, the image record unit 122 can record the image in real time according to the play speed V1.

Besides, the image record unit 122 receives an analog data or digital data outputted from the playing section 110 to record the image. The analog data is preferred audio/video data (A/V data) with NTSC or PAL format, and the digital data has DVI (Digital Visual Interface) or HDVI (High-Definition Vector Imaging) format.

The record and play apparatus of the present invention has an image play unit 112 with varied play speeds and an image record unit 122 following the play speed. Forsaking the disadvantage that the conventional record and play apparatus only records images with 1× even though the play speed reaches higher than 1×, the record and play apparatus of the present invention can efficiently increase record speed and short record time.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An apparatus for recording and reproducing information comprising:
    a playing section comprising: a play speed control unit for determining a play speed; and an image play unit for playing an image according to the play speed; and
    a recording section comprising: a query unit for outputting a query signal to the play speed control unit in order to acquire the play speed; and an image record unit for recording the image in real time according to the play speed.

2. The apparatus for recording and reproducing information according to claim 1, wherein the image record unit receives an analog data outputted from the playing section to proceed the record action.

3. The apparatus for recording and reproducing information according to claim 2, wherein the analog data is audio/video data (A/V data).

4. The apparatus for recording and reproducing information according to claim 1, wherein the image record unit receives a digital data outputted from the playing section to proceed the record action.

5. The apparatus for recording and reproducing information according to claim 4, wherein the digital data has DVI or HDVI format.

6. A method for recording and reproducing information comprising the following steps:
    determining a play speed;
    playing an image according to the play speed;
    outputting a query signal in order to acquire the play speed; and
    recording the image in real time according to the play speed.

7. The method for recording and reproducing information according to claim 6, wherein the image is recorded as an analog data.

8. The method for recording and reproducing information according to claim 7, wherein the analog data is audio/video data (A/V data).

9. The method for recording and reproducing information according to claim 6, wherein the image is recorded as a digital data.

10. The method for recording and reproducing information according to claim 9, wherein the digital data has DVI or HDVI format.

* * * * *